(12) United States Patent
Huang et al.

(10) Patent No.: US 9,763,311 B2
(45) Date of Patent: Sep. 12, 2017

(54) INTERACTIVE LIGHTING EFFECT PORTABLE LIGHT ILLUMINATING DEVICES AND SYSTEM THEREOF

(71) Applicant: iPRO TECHNOLOGY INC., Jhubei (TW)

(72) Inventors: Ta-Wei Huang, Zhubei (TW); Ying-Ko Lu, Zhubei (TW)

(73) Assignee: LUMIC TECHNOLOGY INC., Zhubei (TW)

( * ) Notice: Subject to any disclaimer, the term of this patent is extended or adjusted under 35 U.S.C. 154(b) by 40 days.

(21) Appl. No.: 14/822,923

(22) Filed: Aug. 11, 2015

(65) Prior Publication Data

US 2017/0048951 A1    Feb. 16, 2017

(51) Int. Cl.
*H05B 37/02*    (2006.01)
*H05B 33/08*    (2006.01)

(52) U.S. Cl.
CPC ..... *H05B 37/0272* (2013.01); *H05B 33/0845* (2013.01); *H05B 33/0863* (2013.01)

(58) Field of Classification Search
None
See application file for complete search history.

(56) References Cited

U.S. PATENT DOCUMENTS

| | | | |
|---|---|---|---|
| 6,782,392 B1 * | 8/2004 | Weinberger | G06Q 30/06 |
| 6,807,538 B1 * | 10/2004 | Weinberger | G06F 17/30017 |
| 7,697,925 B1 | 4/2010 | Wilson | |
| 8,866,391 B2 * | 10/2014 | Ganick | G01C 21/206 315/120 |
| 2003/0137258 A1 * | 7/2003 | Piepgras | H05B 33/0863 315/291 |
| 2006/0097660 A1 * | 5/2006 | Scott | H05B 37/029 315/291 |
| 2009/0184837 A1 * | 7/2009 | De Prycker | G06F 3/1446 340/686.1 |
| 2013/0334971 A1 * | 12/2013 | Jones | H05B 37/0272 315/151 |
| 2014/0132390 A1 * | 5/2014 | Loveland | H05B 37/0227 340/5.8 |

(Continued)

FOREIGN PATENT DOCUMENTS

TW    M482230    7/2014

*Primary Examiner* — Crystal L Hammond
(74) *Attorney, Agent, or Firm* — Ding Yu Tan

(57) ABSTRACT

Portable light illuminating device with RF receiver along with interactive lighting effect control system with RF transmitter via wireless data transmissions are provided. RF data burst are captured to illuminate LEDs disposed in portable light illuminating device selectively in accordance with illuminating color and zone assignment data and matching nested hierarchical zone codes, which can be assigned for seating location within one seating zone, several seating zones, and segment within one seating zone. Improvisational manual illuminating color control change for any zone assignment for color control signal can be generated and converted to set of RGB color codes as well as color control signals extracted from sound track using color show control software from PC/laptop can be encoded and sequenced using lighting controller to be transmitted to wireless RF transmitter for broadcasting as data burst. DMX controller and PC/Laptop can also be part of the interactive lighting effect control system.

12 Claims, 18 Drawing Sheets

(56) References Cited

U.S. PATENT DOCUMENTS

| | | | |
|---|---|---|---|
| 2014/0184386 A1 | 7/2014 | Regler et al. | |
| 2014/0239086 A1* | 8/2014 | Wong | B05B 17/08 239/18 |
| 2014/0354153 A1* | 12/2014 | Pulido, Jr. | H05B 33/0854 315/77 |
| 2015/0298607 A1* | 10/2015 | Salter | B60Q 3/82 315/77 |
| 2016/0100471 A1* | 4/2016 | Van De Sluis | H05B 37/0227 315/152 |
| 2016/0157612 A1* | 6/2016 | Lim | A63J 25/00 297/217.2 |
| 2016/0248506 A1* | 8/2016 | Ryan | H04B 10/116 |
| 2016/0307332 A1* | 10/2016 | Ranjan | H04N 5/2256 |

\* cited by examiner

FIG. 14
Prior Art

Table A

| zone region | color code | | | | Tx zone code |
|---|---|---|---|---|---|
| | R | G | B | DIM | |
| zone region A | 255 | 0 | 0 | 0 | 0x01 |
| | 0 | 255 | 0 | 0 | 0x02 |
| | 0 | 0 | 255 | 0 | 0x03 |
| | 0 | 0 | 0 | 255 | 0x04 |
| | 255 | 255 | 0 | 0 | 0x05 |
| zone region B | 255 | 0 | 0 | 0 | 0x06 |
| | 0 | 255 | 0 | 0 | 0x07 |
| | 0 | 0 | 255 | 0 | 0x08 |
| | 0 | 0 | 0 | 255 | 0x09 |
| | 255 | 255 | 0 | 0 | 0x0A |
| zone regions A + B | 255 | 255 | 255 | 255 | 0x0B |
| | 255 | 255 | 255 | 0 | 0x0C |
| | 255 | 255 | 0 | 0 | 0x0D |
| | 0 | 255 | 255 | 255 | 0x0E |
| | 255 | 255 | 255 | 255 | 0x0F |

| zone region | color code | | | | Tx zone code |
|---|---|---|---|---|---|
| | R | G | B | DIM | |
| zone region A | 255 | 0 | 0 | 0 | 0x01 |
| | 0 | 255 | 0 | 0 | 0x02 |
| | 0 | 0 | 255 | 0 | 0x03 |
| | 0 | 0 | 0 | 255 | 0x04 |
| | 255 | 255 | 0 | 0 | 0x05 |
| | 255 | 255 | 255 | 255 | 0x0B |
| | 255 | 255 | 255 | 0 | 0x0C |
| | 255 | 255 | 0 | 0 | 0x0D |
| | 0 | 255 | 255 | 255 | 0x0E |
| | 255 | 255 | 255 | 255 | 0x0F |

Requires 500 bytes of data

Table A

| zone region | color code | | | | Tx zone code |
|---|---|---|---|---|---|
| | R | G | B | DIM | |
| zone region A | 255 | 0 | 0 | 0 | 0x01 |
| | 0 | 255 | 0 | 0 | 0x02 |
| | 0 | 0 | 255 | 0 | 0x03 |
| | 0 | 0 | 0 | 255 | 0x04 |
| | 255 | 255 | 0 | 0 | 0x05 |
| zone region B | 255 | 0 | 0 | 0 | 0x06 |
| | 0 | 255 | 0 | 0 | 0x07 |
| | 0 | 0 | 255 | 0 | 0x08 |
| | 0 | 0 | 0 | 255 | 0x09 |
| | 255 | 255 | 0 | 0 | 0x0A |
| zone regions A + B | 255 | 255 | 255 | 255 | 0x0B |
| | 255 | 255 | 255 | 0 | 0x0C |
| | 255 | 255 | 0 | 255 | 0x0D |
| | 0 | 255 | 255 | 255 | 0x0E |
| | 255 | 0 | 255 | 255 | 0x0F |

| zone region | color code | | | | Tx zone code |
|---|---|---|---|---|---|
| | R | G | B | DIM | |
| zone region A | R_p | G_p | B_p | DIM_p | 0x01 |
| | | | | | 0x02 |

Only 6 bytes of data

FIG. 15

First Zone Code Arrangement for Seating Zone

2nd Zone Code Arrangement for Seating Zone

3rd Zone Code Arrangement for Seating Zone

INTERACTIVE LIGHTING EFFECT PORTABLE LIGHT ILLUMINATING DEVICES AND SYSTEM THEREOF

FIELD OF THE INVENTION

The present invention generally relates to a wireless interactive lighting effect portable light illuminating device and, more particularly, to one or more portable light illuminating devices equipped with LEDs configured to be operating in an integrated and coordinated wireless illuminating environment using an interactive lighting effect control system to produce continuous dynamic lighting or illuminating effects on a mass scale.

BACKGROUND OF THE INVENTION

Wristbands, containing a message or logo and made of silicone, have become popular as reliable and effective authorization device for entry access into various venue events, such as a music concert or sporting event. The wristband typically includes a serial number, a RFID ID tag, or other unique identification markings (such as a barcode) that can be scanned to authenticate the wristband and permits the entry of the wristband wearer through a security checkpoint or a main gate for the venue event. In recent years, some wristbands have added interactive lighting effect functionality using a small battery and integrated LEDs that can be turned "on" or "off" in a group-synchronized or controlled manner during the venue event.

Other than the illuminating LED wristbands, handheld LED glow sticks are also popular electronic devices used for achieving similar interactive lighting effect functionality in venue events, when they are being operated in similar coordinated illuminating patterns to produce continuous illuminating visual effects on a mass scale. Both the illuminating LED wristbands and the handheld glow sticks can be remotely controlled wirelessly under radio frequency signal broadcasts, by using a RF transmitter, a lighting controller and proprietary control software on laptop or PC.

Some of the limitations of the existing related technologies adopted by the illuminating LED wristbands and handheld LED glow sticks are that all of the pre-programmed LED illumination light control sequences, indexed by corresponding activation codes, have to be stored ahead of time before each venue event inside the memory thereof, which means that, in order to achieve a lighting performance for an entire venue event having more sophisticated or intricate lighting or illuminating sequences would certainly require to store a huge amount of light control data in the memory for matching against the huge number of necessary lighting changes. In addition, every new venue event with different illumination color changes and effects requires to have the aforementioned pre-programmed LED illumination light control sequences, indexed by corresponding activation codes. Meanwhile, the existing lighting control methods for the illuminating LED wristbands and handheld LED glow sticks do not allow for any surprise, improvisational or spur of the moment lighting changes to be integrated on top of the pre-programmed LED illumination sequences. In other words, any single change must be already pre-programmed into each of the memory of the illuminating LED wristbands and handheld LED glow sticks ahead of time, for such lighting change to be properly implemented during the venue event; otherwise, the illuminating LED wristbands and handheld LED glow sticks would not be able to handle any new improvisational light control change without having the necessary data in the memory (pairing of light control sequence action and corresponding activation code). Therefore, as examples, a name of a surprise guest arriving to the stage of a concert event or an actual real-time score taking place in a sporting event cannot be choreographed to be presented into proper illumination sequences among a sea of the illuminating LED wristbands and handheld LED glow sticks. Meanwhile, more subtle color changes during a choreographed lighting control sequence carry along very high data overhead for the memory of each illuminating LED wristbands and handheld LED glow sticks, because each subtle color change has to have a separate entry for performing each pre-programmed light control sequence, indexed by corresponding activation code in the memory.

Therefore, there is a need in the related art in providing a more flexible, dynamic, improvisational and interactive lighting and entertainment effects on a mass scale having reduced memory overhead or burden on each illuminating LED wristbands and handheld LED glow sticks without noticeable sacrifice in performance or lag.

SUMMARY OF THE INVENTION

The present invention provides an interactive lighting effect portable light illuminating device adapted for use with an interactive lighting effect control system with a RF transmitter via wireless data transmissions.

The present invention provides the interactive lighting effect portable light illuminating device to have the following: a memory having stored therein at least one zone region indexed by one or more nested hierarchical zone codes, an RF receiver configured to receive an RF data burst and to capture the RF data burst from the RF transmitter of the interactive lighting effect control system upon verifying authenticity of the RF data burst, a controller responsive to the RF data burst, and is coupled to the memory, and at least one light source disposed in the interactive lighting effect portable light illuminating device, the at least one light source being operationally responsive to the controller to change an illuminating state thereof.

The present invention provides wireless data transmission in the form of RF data bursts from the interactive lighting effect control system comprising at least one set of illuminating color and zone assignment data, in which the controller of the interactive lighting effect control system is configured to cause the at least one light source of the interactive lighting effect portable light illuminating device to be selectively illuminating in accordance with the illuminating color and zone assignment data of the RF data burst and matching the one or more nested hierarchical zone codes stored in the memory of the portable light illuminating device.

The present invention provides the interactive lighting effect portable light illuminating device having more than one light source, the controller is configured to cause the light sources selectively to emit light in accordance with a received illuminating color and zone assignment sequence data file for providing continuous automated and coordinated lighting effect.

The present invention provides a received illuminating color and zone assignment sequence data file comprising a plurality of prearranged illuminating intensities of red, green and blue light emitting diodes (LEDS) and the nested hierarchical zone codes of the zone regions in sequential data burst timing.

The present invention provides a plurality of light emitting diodes (LEDs) having at least colors of red, green and blue for the light sources in each interactive lighting effect portable light illuminating device, in which illuminating intensity of the red, green and blue LEDS are configured in accordance with red, green and blue color codes (R, G, B) ranging from 0 to 255, respectively.

The present invention further provides optionally a dimmer color code (DIM) ranging from 0 to 255, respectively, and red, green and blue color codes (R1, G1, B1), are respectively determined by: R1=R×DIM/255; G1=G×DIM/255; B1=B×DIM/255.

The present invention provides illuminating states of the light source comprising on, off, or flashing for the interactive lighting effect portable light illuminating device.

The present invention provides two or more interactive lighting effect portable light illuminating devices are capable of receiving the same set of illuminating color and zone assignment data to cause the light sources selectively to be illuminating in accordance with the same illuminating color and zone assignment data.

The present invention provides the one or more nested hierarchical zone codes of the zone regions belonging to the at least one set of illuminating color and zone assignment data to be comprising a first zone code assigned for seating location within one seating zone, a second zone code assigned for a plurality of seating zones, and a third zone code assigned for a segment within one seating zone of the portable light illuminating device.

The present invention provides the set of illuminating color and zone assignment data comprising illuminating intensity of the red, green and blue LEDS and the one or more nested hierarchical zone codes of the zone regions.

The present invention provides interactive lighting effect portable light illuminating device in various structures and configurations, such as, for example, an illuminating LED wristband, an illuminating LED necklace, or a handheld LED glow stick.

The present invention provides an interactive lighting effect control system configured and adapted for use together with the interactive lighting effect portable light illuminating devices, in which the interactive lighting effect control system comprising a wireless transmitter comprising a memory and at least one lighting controller, the at least one lighting controller generating a color control signal, the color control signal comprising an illuminating color and zone assignment data, the lighting controller is coupled to the memory of the wireless transmitter, the color control signal is transmitted to the wireless transmitter, the wireless transmitter is an RF transmitter configured to broadcast the color control signal in a plurality of RF data bursts in sequential order, and at least one wireless receiver, the at least one wireless receiver is configured to intercept and respond to the RF data bursts broadcasted from the wireless transmitter upon verifying the authenticity thereof. Each of the RF data burst comprising the illuminating color and zone assignment data for the at least one wireless receiver having a memory therein storing at least one zone region indexed by one or more nested hierarchical zone codes, the wireless transmitter to be initiating sequential broadcasting at a time $t_n$ of one color control signal in one RF data burst to the interactive lighting effect portable light illuminating device, and initiating sequential broadcasting at a time $t_{n+1}$ of another color control signal in another RF data burst to the interactive lighting effect portable light illuminating device, upon receiving of the RF data burst for the color control signal by the interactive lighting effect portable light illuminating device, a controller therein performing authentication verification of an identification code from the illuminating color and zone assignment data of the received RF data burst of the color control signal and inspecting whether the identification code of the color control signal after calculation is correct or not, and initiating change of illuminating color of a plurality of LEDs in the interactive lighting effect portable light illuminating device in accordance with the color control signal comprising a plurality of illuminating colors for a plurality of light sources of the interactive lighting effect portable light illuminating devices defined by a set of red, green, and blue (R, G, B) color codes.

The present invention provides optionally one or more repeaters to be configured and adapted to be used increase a transmission coverage area of RF data bursts thereof.

The present invention provides the wireless receiver to be configured and disposed in the interactive lighting effect portable light illuminating device.

The present invention provides redundant RF data bursts to be sequentially broadcasted at the time $t_n$ and at the time $t_{n+1}$ comprising of the same redundant color control signal in consecutive RF data bursts to the interactive lighting effect portable light illuminating device.

The present invention provides a DMX and sound track input control method using the interactive lighting effect control system, comprising steps of: (a) starting a wireless illuminating color control process; (b) determining whether or not to switch a control mode from a program mode to a DMX control mode, and if so, continue to step (c) and if not, continue to step (d); (c) directly sending out a plurality of color control signals extracted from a sound track using a color show control algorithm in a DMX controller; (d) directly sending out the color control signals extracted from the sound track using a color show control software on a laptop or a computer; continue to step (g); (e) generating an improvisational manual illuminating color control change for any zone assignment in one or more nested hierarchical zone codes of one or more zone regions data field for each color control signal, converting the improvisational manual illuminating color control change to a set of red, green and blue (R, G, B) color codes at the DMX controller, and determining whether or not to accept the R, G, B color codes inputted at the DMX controller, and if so, continue to step (f), and if not, continue to step (g); (f), replacing the R, G, B color codes of the color control signals by the R, G, B color codes inputted at the DMX controller in substantially real time, and continue to step (g); (g) transmitting the color control signals to a lighting controller through an interface; (h) encoding and sequencing the color control signals using the lighting controller to be transmitted to a wireless RF transmitter; and (i) initiating a RF data burst transmission from the wireless RF transmitter.

Some of the advantages of the portable light illuminating devices equipped with LEDs or the interactive lighting effect portable light illuminating device configured to be operating in an integrated and coordinated illuminating environment to produce continuous dynamic visual effects on a mass scale using the interactive lighting effect control system of present invention, in which the portable light illuminating devices equipped with LEDs can be illuminating LED wristbands and/or handheld LED glow sticks, include at least the following: (a) none of pre-programmed LED illumination light control sequences, indexed by corresponding activation codes, need to be stored inside the memory thereof; (b) achieving a lighting performance for an entire venue event having plenty of sophisticated or intricate illuminating sequences would only a small amount of zone code multi-level assignment hierarchical table data to be pre-stored in the memory for implementing various surprise or improvisational lighting changes; (c) any lighting or illumination change can be integrated on the fly on top of or manually overriding the pre-programmed LED illumination sequences at any time using a DMX lighting controller. In other words, any desired lighting change with various improvisational zone code behaviors need not be already pre-programmed into each of the memory of the illuminating LED wristbands and handheld LED glow sticks ahead of time, for such lighting change to be properly implemented during the venue event. (pairing of light control sequence action and corresponding activation code are not needed at all). Therefore, when a surprise guest arrives at the stage of a concert event or an actual real-time score taking place in a sporting event can be effectively incorporated seamlessly transition into on-going illumination sequences among a large number of the illuminating LED wristbands and handheld LED glow sticks; (d) subtle color changes during a choreographed lighting control sequence would carry along the same amount of data overhead for the memory of each illuminating LED wristbands and handheld LED glow sticks, because each subtle color change is entered as a RF data burst transmission comprising a set of illuminating color and zone assignment data in the form of a data packet to be broadcasted to all illuminating LED wristbands and handheld LED glow sticks; (e) having improved and more diverse zone assignment capability using more than one nested hierarchical zone codes for the assignment of the zone regions; (f) allows for improved scalability and expansion for usage on a larger scale through adding one or more repeaters for increasing the coverage range of the RF data transmission.

BRIEF DESCRIPTION OF THE DRAWINGS

The present invention will become more readily apparent to those ordinarily skilled in the art after reviewing the following detailed description and accompanying drawings, in which:

FIG. 10 shows audio sampling performed using Ts to the sound track raw data to extract the sound vibration amplitude, As.

FIG. 14 shows tables for a test example for a conventional interactive lighting effect control system showing total amount of data storage required within the memory of each interactive lighting effect portable light illuminating device necessary for achieving the illuminating effects of table A located on the left-hand side therein.

FIG. 15 shows tables for a test example for the interactive lighting effect control system of the embodiment of present invention showing total amount of data storage required within the memory of each interactive lighting effect portable light illuminating device necessary for achieving the illuminating effects of table A located on the left-hand side therein.

DETAILED DESCRIPTION OF PREFERRED EMBODIMENTS

The present invention will now be described more specifically with reference to the following embodiments. It is to be noted that the following descriptions of the embodiments of this invention are presented herein for purpose of illustration and description only. It is not intended to be exhaustive or to be limited to the precise form disclosed.

Figure 1:
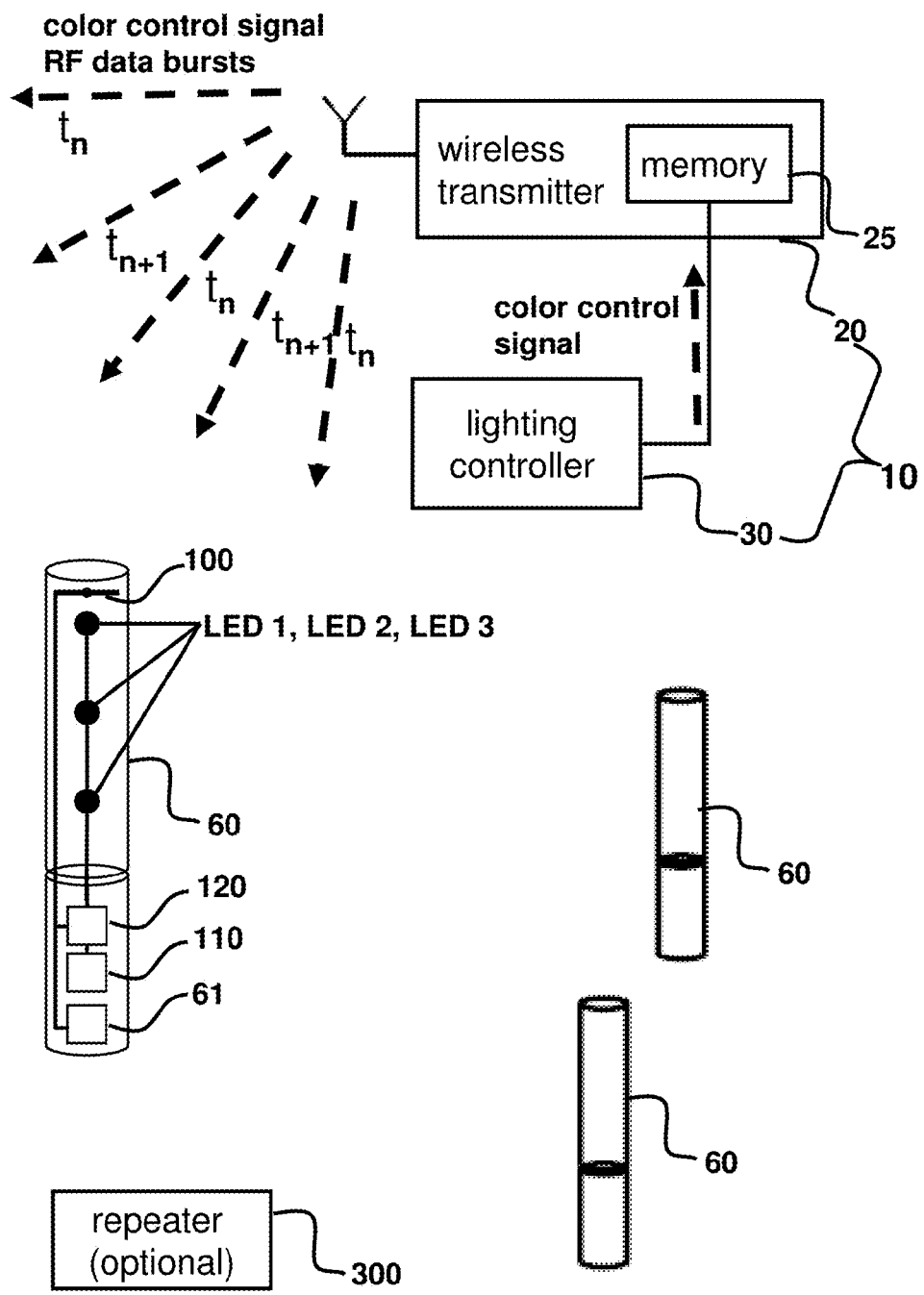
FIG. 1 shows a block diagram of an interactive lighting effect control system working together with a plurality of interactive lighting effect portable light illuminating devices in accordance to an embodiment of present invention.
Figure 2:
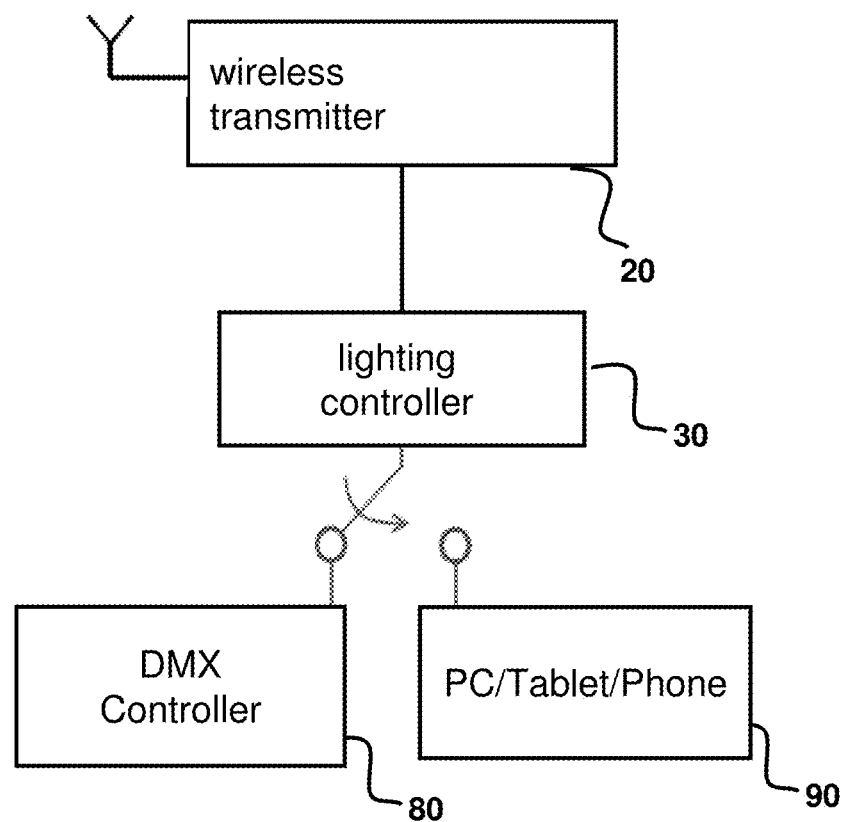
FIG. 2 shows a more detailed block diagram of the interactive lighting effect control system in accordance with the embodiment of present invention.
Figure 5:
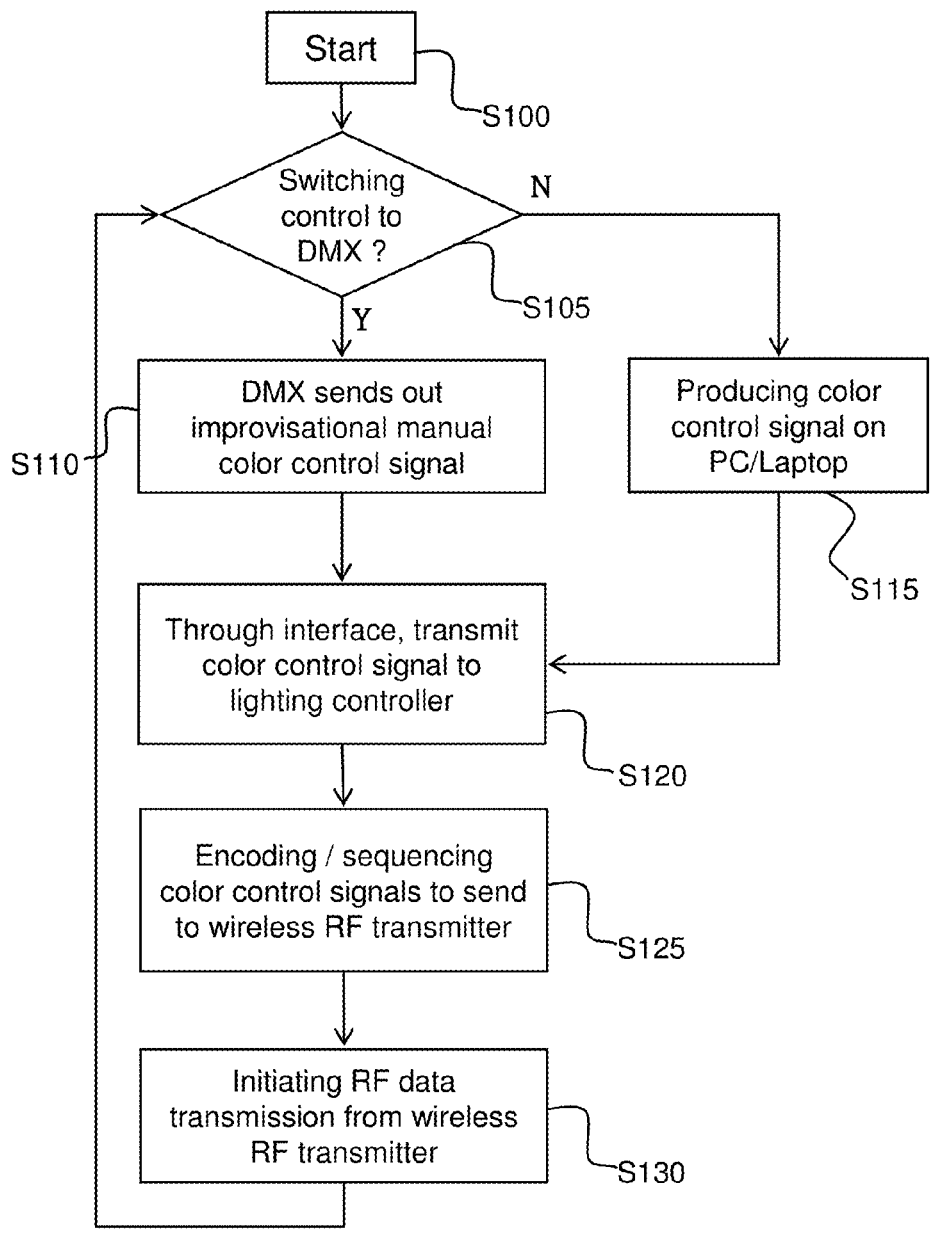
FIG. 5 shows a flow chart of a wireless RF data transmission method using DMX controller and PC/laptop/phone in accordance to the embodiment of present invention.

As shown in FIGS. 1 and 2 together, an interactive lighting effect control system 10 configured and adapted for use together with a plurality of interactive lighting effect portable light illuminating devices 60 in accordance with an embodiment of present invention is shown. The interactive lighting effect control system 10 includes a wireless transmitter 20 comprising a memory 25 and at least one lighting controller 30. The wireless transmitter 20 can be formed or provided by an RF transmitter chip together with other accessory electronic components, such as, for example, Texas Instrument model number CC2541 or CC2500 RF transceiver. In addition, as shown in FIG. 2, the lighting effect control system 10 can also include a DMX controller 80 and a PC/laptop/Phone 90. A complete set of illuminating color and zone assignment sequence data for an entire light show can be stored ahead of time of the venue event on the PC/laptop/Phone 90 and/or the DMX controller 80. Referring to FIG. 5, the DMX controller 80 and the PC/laptop/phone 90 can be used to provide wireless RF data transmission and illuminating color control process by switch a control mode from a program mode to a DMX control mode so as to be able to send out an improvisational manually-adjusted color control signal or a pre-stored color control signal using the DMX controller 80. Meanwhile, a color show control algorithm and a color light show program on the PC/laptop/phone 90 can also be used to produce a color control signal. The lighting controller 30 generates a color control signal, and the color control signal comprising an illuminating color and zone assignment data 600 (shown in FIG. 12). As shown in FIG. 1, the lighting controller 30 is coupled to the memory 25 of the wireless transmitter 20, the color control signal is transmitted to the wireless transmitter 20. The wireless transmitter 20 is an RF transmitter configured to broadcast the color control signals in a plurality of RF data bursts in sequential order. In this illustrated embodiment as well as other embodiments of present invention, a wireless receiver 61 is disposed inside a lighting effect portable light illuminating device 60. In the illustrated embodiment, the wireless receiver is configured to be coupled to an antenna 100 and a controller 120, respectively, in the interactive lighting effect portable light illuminating device 60. The wireless receiver 61 can be provided by an RF receiver chip together with other accessory electronic components, such as, for example, Texas Instrument model number CC2541 or CC2500 RF transceiver. The wireless receiver 61 in the lighting effect portable light illuminating device 60 is configured to intercept and respond to the RF data bursts broadcasted from the wireless transmitter 20 upon verifying the authenticity thereof. Each of the RF data bursts includes the illuminating color and zone assignment data 600 for the at least one wireless receiver 61 having a memory 110 inside the interactive lighting effect portable light illuminating devices 60 for storing at least one zone region indexed by one or more nested hierarchical zone codes 700 (see FIG. 12).

Figure 12:
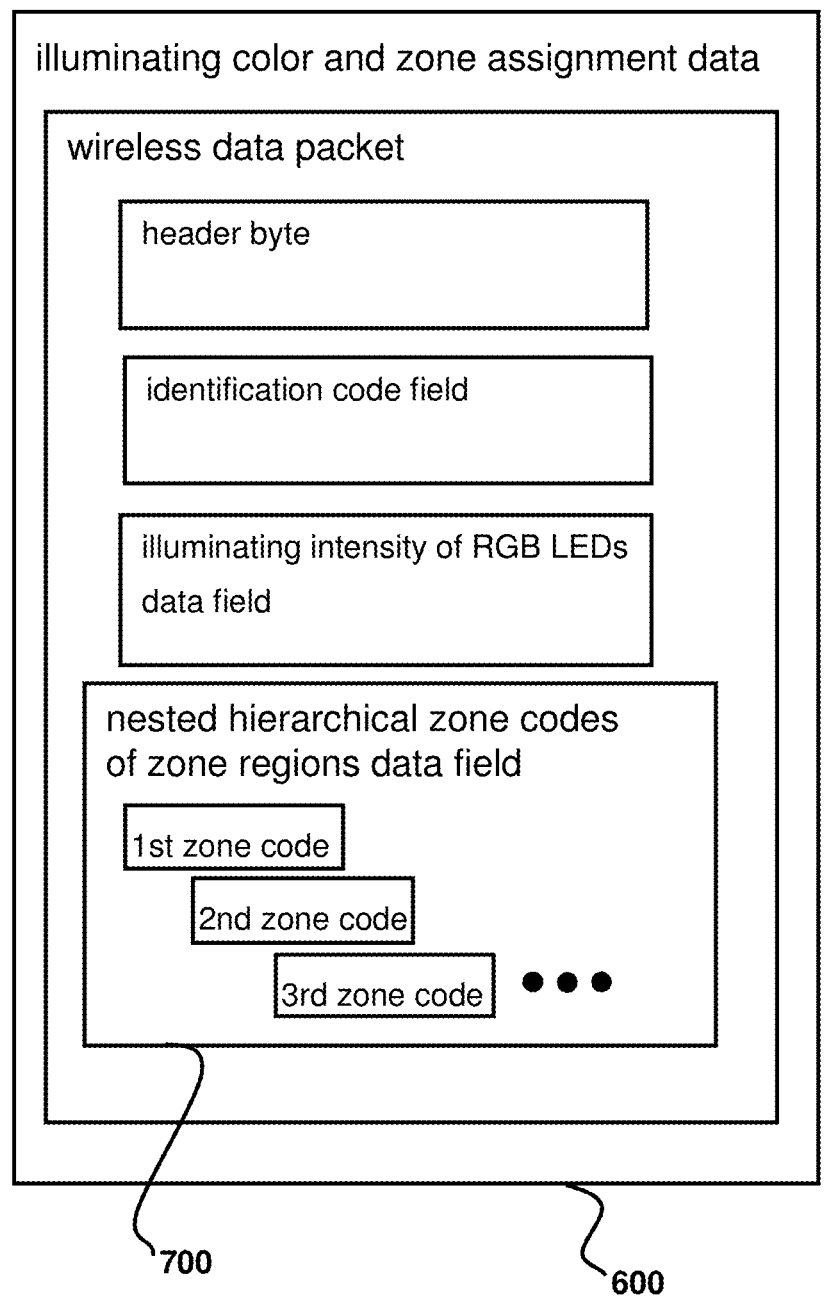
FIG. 12 shows a block diagram of an illuminating color and zone assignment data of a color control signal in accordance with embodiments of present invention.
Figure 13:
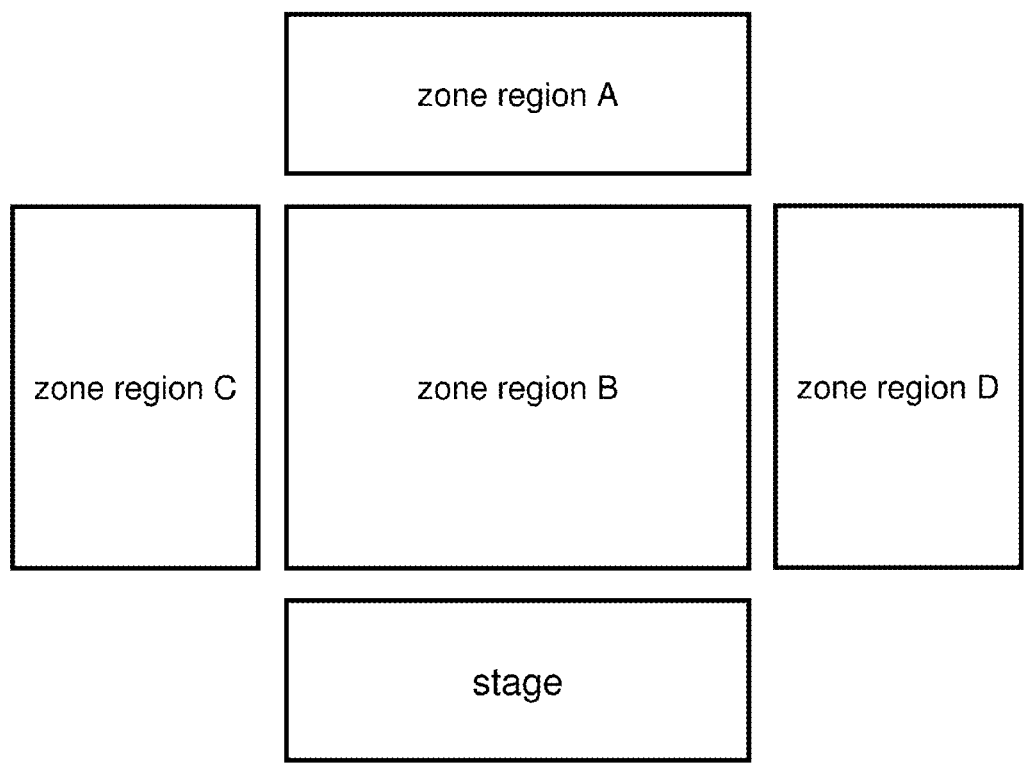
FIG. 13 shows a block diagram of an example of a seating layout at a venue event.

Referring to FIGS. 1 and 2, the wireless transmitter 20 initiates sequential broadcasting at a time $t_n$ of one color control signal in one RF data burst to the interactive lighting effect portable light illuminating device 60, and initiating a sequential broadcasting at a time $t_{n+1}$ of another color control signal in another RF data burst to the interactive lighting effect portable light illuminating device 60. Upon receiving of the RF data burst for the color control signal by the interactive lighting effect portable light illuminating device 60, a controller 120 therein performing authentication verification of an identification code (i.e. the identification code can be provided by the Checksum or CRC (Cyclic Redundancy Check) byte of the color control signal) from the illuminating color and zone assignment data 600 of the received RF data burst of the color control signal and inspecting whether the identification code of the color control signal after calculation is correct or not, and initiating change of illuminating color of a plurality of light emitting diodes LED1, LED2, LED3 in the interactive lighting effect portable light illuminating device 60 in accordance with the color control signal having different illuminating colors for a plurality of light sources LED1, LED 2, LED3 of the interactive lighting effect portable light illuminating devices 60 defined by a set of red, green, and blue (R, G, B) color codes. In the RF data bursts of the illustrated embodiment, the illuminating color and zone assignment data 600, as shown in FIG. 12, includes a wireless data packet comprising of a header byte, an identification code field, an illuminating intensity of red, green and blue light emitting diodes (LED1, LED2, LED3) data field, and a set of one or more nested hierarchical zone codes 700 of the zone regions data field for each illuminating color control signal. The illuminating intensity of RGB LEDs data field sent to the interactive lighting effect portable light illuminating devices 60 include red, green, and blue (RGB) color codes ranging in illuminating intensities from 0 to 255, respectively. Examples of illuminating intensity of RGB LEDs are as follow: 255, 0, 0 for a first color code set (Red); 0, 255, 0 for a second color code set (Green); 0, 0, 255 for a third color code set (Blue); and 95, 9, 215 for a fourth color code set (Purple), etc. The above are merely examples, and millions of different illuminating colors for the LEDs can be achieved through different sets of color codes. The set of nested hierarchical zone codes 700 of the zone regions includes a first zone code assigned for seating location within one seating zone, a second zone code assigned for a plurality of seating zones, and a third zone code assigned for a segment within one seating zone of the portable light illuminating device 60. An example of the first zone code can be 0x10, 0x11, 0x12, 0x13, 0x14, or 0x15; an example of the second zone code can be 0x20 or 0x21; an example of the third zone code can be 0x30, 0x31, 0x32, 0x33 or 0x34. Meanwhile, a smallest number of seat that qualifies as a zone region so as to be assigned a zone code (number) can be one. Each seating zone can be allocated to be matched with a numbered zone of an arena, concert hall, or venue event that can be found in a typical seating map or seating chart thereof.

Figure 16:
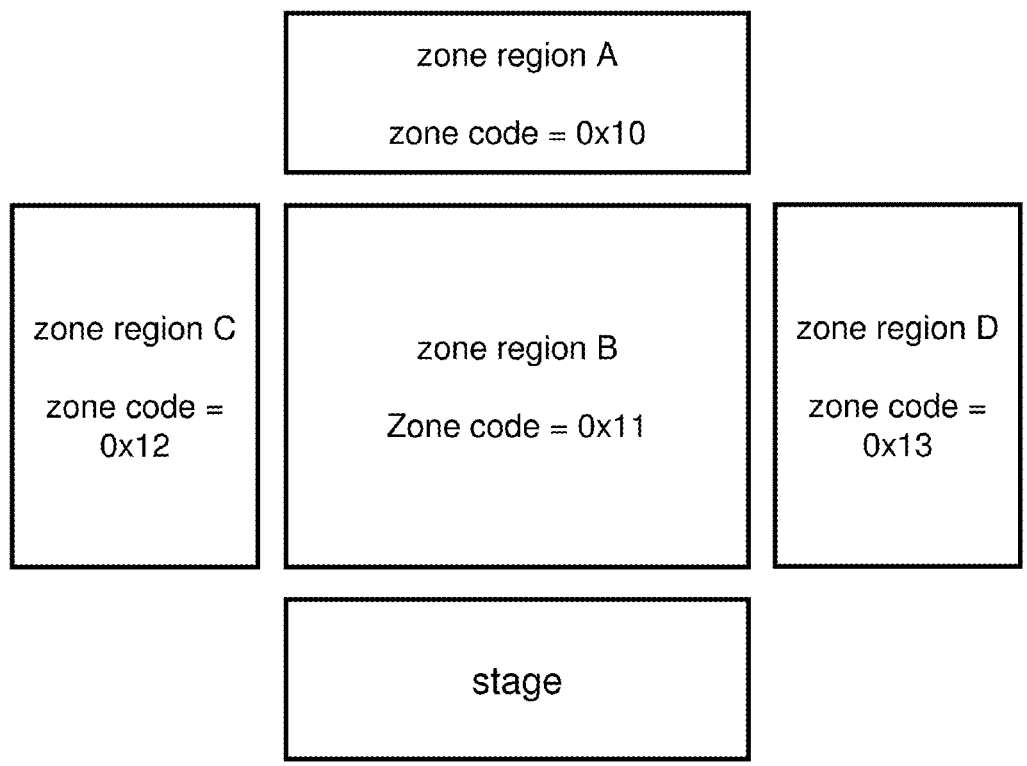
FIG. 16 shows an illustrative example of a layout diagram of first zone code arrangement for seating zones according to the embodiment of present invention.

Table 1 below shows an example of a set of nested hierarchical zone codes 700 with only the first zone code assigned for seating location within one seating zone. In addition, the first zone code arrangements for seating zone found in Table 1 below is also shown as a layout diagram in FIG. 16 for further clarification.

TABLE 1

| One zone code example | |
| --- | --- |
| Seating zone | First zone code |
| Zone A | 0x10 |
| Zone B | 0x11 |
| Zone C | 0x12 |
| Zone D | 0x13 |

Figure 17:
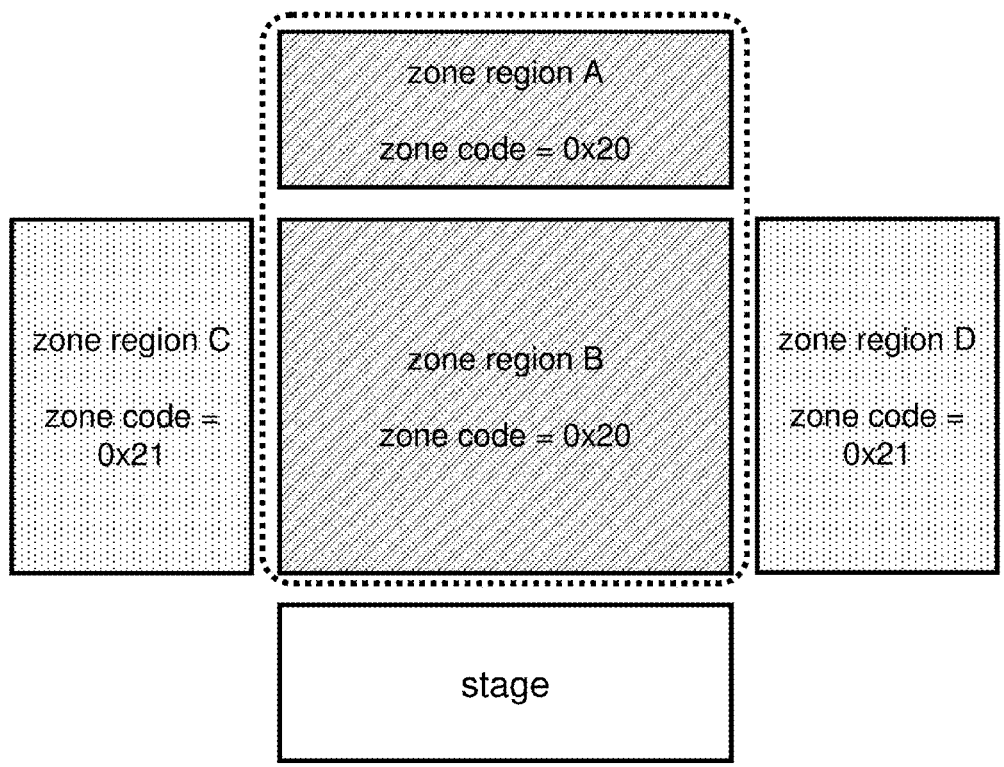
FIG. 17 shows an illustrative example of a layout diagram of second zone code arrangement for seating zones according to the embodiment of present invention.

Table 2 below shows an example of a set of nested hierarchical zone codes 700 with the first zone code assigned for seating location within one seating zone and the second zone code assigned for several seating zones. In addition, the second zone code arrangements for seating zone found in Table 2 below is also shown as a layout diagram in FIG. 17 for further clarification.

TABLE 2

| Two zone codes example | | |
| --- | --- | --- |
| Seating zone | First zone code | Second zone code |
| Zone A | 0x10 | 0x20 |
| Zone B | 0x11 | |
| Zone C | 0x12 | 0x21 |
| Zone D | 0x13 | |

Table 3 below shows an example of a set of nested hierarchical zone codes 700 which includes third zone codes. In addition, the third zone code arrangements for seating zone found in Table 3 below is also shown as a layout diagram in FIG. 18 for further clarification.

Figure 18:
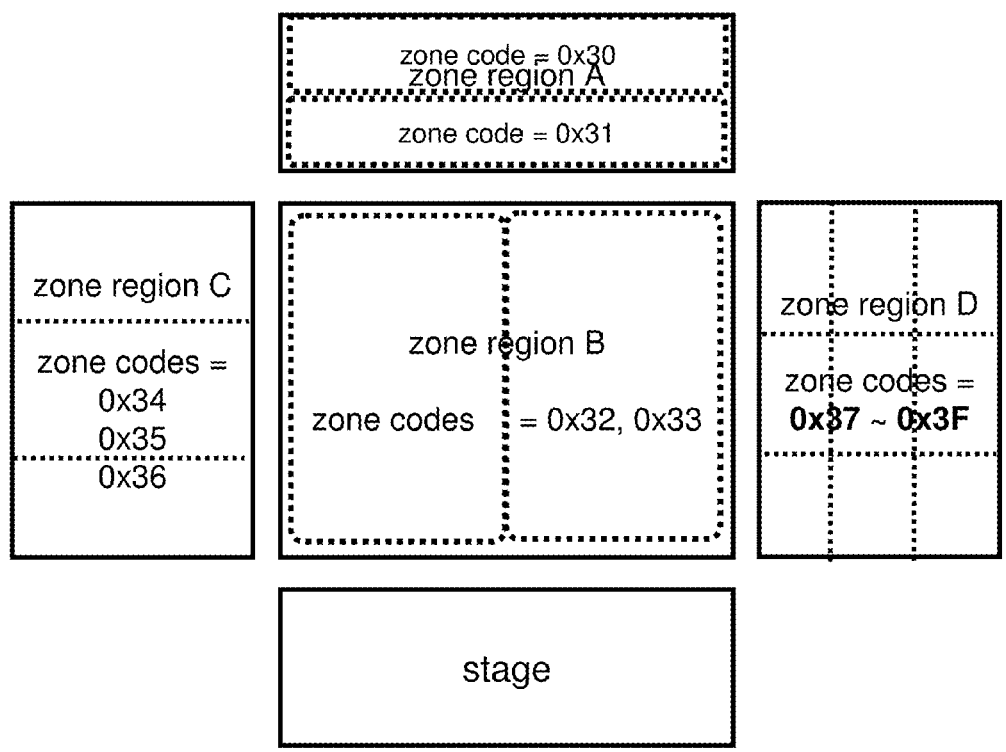
FIG. 18 shows an illustrative example of a layout diagram of third zone code arrangement for seating zones according to the embodiment of present invention.

As can be seen from FIG. 18, the zone region D is divided into 9 sub-zones, in which there are now 9 sub-zones within one seating zone/zone region D. In addition, the zone region C is divided into three sub-zones, with third zone codes of 0x34, 0x35, and 0x36, respectively. Likewise, zone region B is divided into two sub-zones with third zone codes of 0x32, 0x33, respectively.

TABLE 3

Three zone codes example

| Seating zone | First zone code | Second zone code | Third zone code |
|---|---|---|---|
| Zone A | 0x10 | 0x20 | 0x30 |
|  |  |  | 0x31 |
| Zone B | 0x11 |  | 0x32 |
|  |  |  | 0x33 |
| Zone C | 0x12 | 0x21 | 0x34 |
|  |  |  | 0x35 |
|  |  |  | 0x36 |
| Zone D | 0x13 |  | 0x37 |
|  |  |  | 0x38 |
|  |  |  | ... |
|  |  |  | 0x3F |

Figure 3:
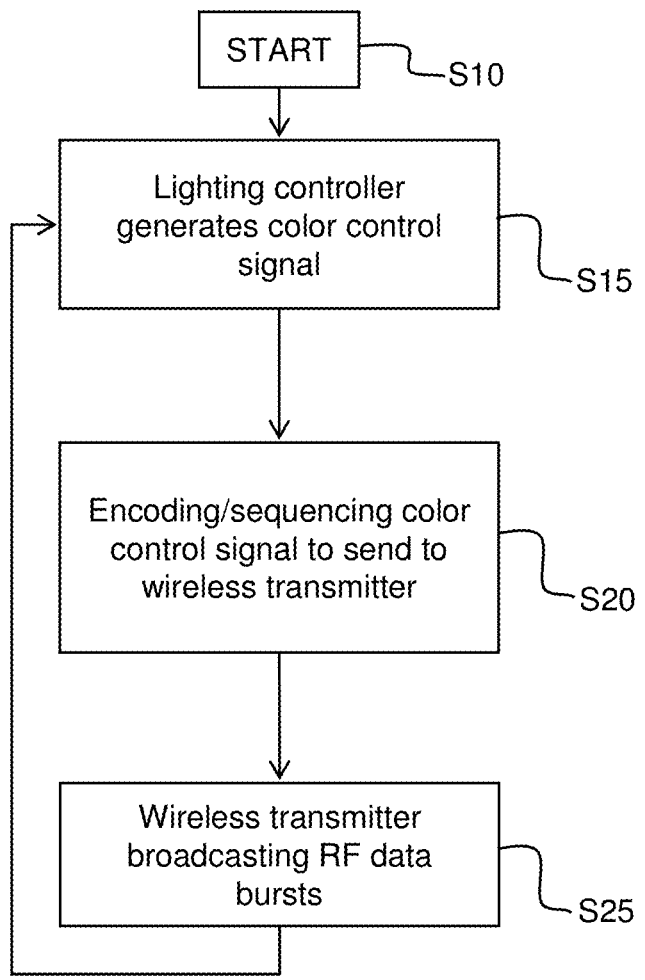
FIG. 3 shows a flow chart of a wireless RF data transmission method using the interactive lighting effect control system of the embodiment of present invention.

During the RF data broadcasting process as shown in FIGS. 2 and 3, redundant RF data bursts can be sequentially broadcasted at the time $t_n$ and at the time $t_{n+1}$ comprising of the same redundant color control signal in consecutive RF data bursts to the interactive lighting effect portable light illuminating device 60, so as to ensure that if any of the portable light illuminating device 60 had inadvertently missed or skipped the reception of RF data bursts at the time $t_n$, thus upon successfully receiving the same redundant RF data burst at time $t_{n+1}$ (comprising of the same redundant color control signal), such portable light illuminating device 60 can be made to catch up with other portable light illuminating devices 60 located in the same zone.

Referring to FIGS. 1 and 2, an interactive lighting effect portable light illuminating device 60, adapted for use with the interactive lighting effect control system 10 with a RF transmitter/wireless transmitter 20 via wireless data transmissions, is shown in a block diagram. The interactive lighting effect portable light illuminating device 60 includes a memory 110 having stored therein at least one zone region indexed by one or more nested hierarchical zone codes 700, an RF receiver 61 configured to receive an RF data burst and to capture the RF data burst from the RF transmitter 20 of the interactive lighting effect control system 10 upon verifying authenticity of the RF data burst, a controller 120 responsive to the RF data burst, and is coupled to the memory 110. The RF receiver 61 is electrically connected to the antenna 100 and the controller 120, respectively. At least one light source LED1, LED2, LED3 is disposed in the interactive lighting effect portable light illuminating device 60. The at least one zone region indexed by the one or more nested hierarchical zone codes 700 for each interactive lighting effect portable light illuminating device 60 includes a first zone code assigned for seating location within one seating zone, an (optional) second zone code assigned for a plurality of seating zones, and an (optional) third zone code assigned for a segment within one seating zone of the portable light illuminating device. Thus, the memory 110 of each (particular) interactive lighting effect portable light illuminating device 60 has a set of zone codes for the at least one zone regions stored therein to specifically identify and locate that particular portable light illuminating device 60.

The at least one light source LED1, LED2, LED3 being operationally responsive to the controller 120 to change an illuminating state thereof. RF data burst includes at least one set of illuminating color and zone assignment data, which can be in the form such as, for example: Example 1: 255, 0, 0, 0x12, 0x20, 0x37 (for a set with R, G, B color codes and first, second, and third zone codes, respectively). Referring to Table 3, the zone region C seating zone will all be illuminating in red color, the zone region A seating zone and the zone region B seating zone will all be illuminating in red color, and the zone region D seating zone having (sub-zone) third zone code of 0x37 will be illuminating in red color. Example 2: 0, 0, 255, 0x13 (for a set with R, G, B color codes and first zone code); The zone region D seating zone will all be illuminating in blue color. Example 3: 0, 0, 255, 0x10, 0x21 (for a set with R, G, B color codes, first zone code and second zone code), in which the zone regions A, C, and D will be illuminating in blue color. Example 4: 0, 15, 251, 0x30 (for a set with R, G, B color codes, and third zone code), as shown also in FIG. 18, the top portion of zone region A (with $3^{rd}$ zone code of 0x30) will be illuminating with R, G, B color codes of 0, 15, 251.

The controller 120 is configured to cause the at least one or, for example, three light sources LED1, LED2, LED3 selectively to be illuminating in accordance with the illuminating color and zone assignment data of the RF data burst and matching the one or more nested hierarchical zone codes 700 stored in the memory 110 of the portable light illuminating device 60. Alternatively, the controller 120 can be configured to cause the light sources LED1, LED2, LED3 selectively to emit light in accordance with a received illuminating color and zone assignment sequence data file for providing continuous automated and coordinated lighting effect. The received illuminating color and zone assignment sequence data file is a complete set of illuminating color and zone assignment sequence data that has been configured for an entire light show, which can be stored ahead of time on a laptop or a PC or a DMX controller. The received illuminating color and zone assignment sequence data file includes a plurality of prearranged illuminating intensities for the red, green and blue light emitting diodes (LED1, LED2, LED3) and the nested hierarchical zone codes 700 of the zone regions in sequential data burst timing order. Thus, the light emitting diodes LED1, LED2, LED3 are the light sources that are LEDs having at least colors of red, green and blue, in which illuminating intensity of the red, green and blue LEDS are configured in accordance with red, green and blue color codes (R, G, B) ranging from 0 to 255, respectively. In an alternative embodiment, the illuminating intensity of the red, green and blue LEDs further includes a dimmer color code (DIM) ranging from 0 to 255, respectively, and red, green and blue color codes (R1, G1, B1), are respectively determined by: R1=R×DIM/255; G1=G×DIM/255; B1=B×DIM/255.

To facilitate operation in an integrated and coordinated wireless illuminating environment to produce continuous dynamic lighting or illuminating effects on a mass scale, the one or more nested hierarchical zone codes 700 of the zone regions for the interactive lighting effect portable light illuminating device 60 includes the first zone code assigned for seating location within one seating zone, the second zone code assigned for a plurality of seating zones, and the third zone code assigned for a segment within one seating zone of the portable light illuminating device 60. In addition, the set of illuminating color and zone assignment data 600 include illuminating intensity of the red, green and blue LEDS and the one or more nested hierarchical zone codes 700 of the zone regions. Two or more interactive lighting effect portable light illuminating devices 60 that are preconfigured with at least one zone region of the one or more nested hierarchical zone codes stored in the memory to be the same are capable of receiving the same set of illuminating color and zone assignment data 600 to cause the light sources selectively to be illuminating in accordance with the same illuminating color and zone assignment data 600, such as for example, when these portable light illuminating devices 60 are in the same first zone, second zone, and third zone.

In embodiments of present invention, the following features or resources are provided: the illuminating states of the light source include on, off, or flashing. In other words, any number of red, green and blue light emitting diodes (LED1, LED2, LED3) can be turned on or powered on, turned off or powered off, or flashing on and off in repeating pattern with a specified frequency (i.e. 2 times per second). Turning on means or entails that at least one of the R, G, B color codes is not zero. Turning off means that all of the R, G, B color codes are set to be zero, or that the dimmer color code is set to zero. The flashing on and off setting or operating mode can be configured through the fourth zone code, such as, for example, setting all of the zone regions fourth zone code to be 0xFF, so that when upon receiving the 0xFF (fourth zone code), all of the corresponding zone region will be flashing on and off in a synchronized manner. The color for the flashing on/off can be set by the corresponding R,G,B color code data. Meanwhile, the flashing frequency can be configured or set by the controller 120 of the interactive lighting effect portable light illuminating device 60 to be given a preset flashing frequency value, i.e. 2 flashings/second, or through generating a random number by the controller 120. The wireless data transmissions can be performed by RF data bursts or Wi-Fi, Bluetooth or ZigBee transmissions. The interactive lighting effect portable light illuminating device 60 can be an illuminating LED wristband, an illuminating LED necklace, or a handheld LED glow stick, but is not limited to these options, and can be adapted to other types of illuminating devices with wireless communication capability. In alternative embodiment, a fourth zone code, or even more zone codes can be adopted beyond the existing three zone codes configuration, so long as the corresponding portable light illuminating devices 60 are properly configured to utilize these additional zone codes as well. In addition, lag would need to be taken into account for having larger data burst size with added zone codes. The fourth zone code can be also used for turning on or turning off all of the portable light illuminating devices 60 simultaneously or substantially at the same time within microseconds difference therebetween. In an alternative embodiment, one or more repeaters 300 can be optionally configured and adapted to be used increase a transmission coverage area of RF data bursts thereof for the interactive lighting effect control system 10.

Various implementation methods are provided for the portable light illuminating devices using the interactive lighting effect control system in accordance with present invention. For example, as shown in FIG. 3, a flow chart diagram of a wireless RF data transmission method is shown, which includes the following steps: In step S10, a RF data transmission process (at the interactive lighting effect control system) is begun or started. In step S15, a lighting controller generates a color control signal. In step S20, the lighting controller encoding and sequencing the color control signal to be sent to a wireless transmitter. In step S25, the wireless transmitter broadcast data bursts via an RF data transmission. The wireless RF data transmission method is adopted and performed by the interactive lighting effect control system 10.

Figure 4:
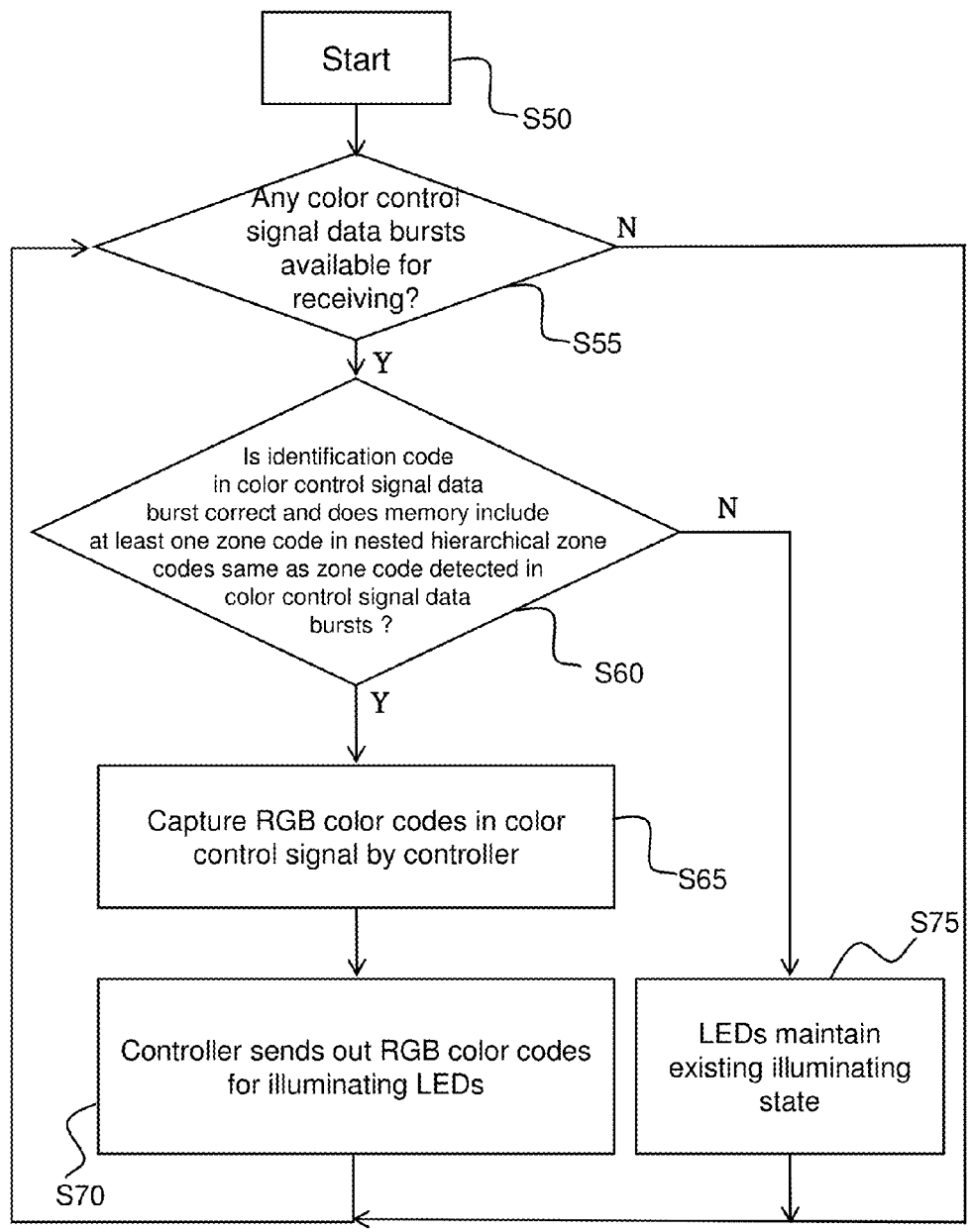
FIG. 4 shows a flow chart of a wireless RF data receiving method at the interactive lighting effect portable light illuminating device in accordance to the embodiment of present invention.

As shown in FIG. 4, a flow chart diagram of a wireless RF data receiving method is shown, which includes the following steps: In step S50, a RF data receiving process (at the interactive lighting effect portable light illuminating device 60) is begun. In step S55, whether any color control signal bursts are available for receiving is determined, and if the answer is "Yes", then continue to step S60, and if the answer is "No", then repeat step S55. In step S60, determining if the identification code that is found in the color control signal data burst (after calculation) is correct and whether or not the memory includes at least one zone code found in the nested hierarchical zone codes to be identical to or the same as the zone code detected in the color control signal data bursts, and if the answer is "YES", then continue to step S65, and if the answer is "No", then continue to step S75. In step S65, the controller is capturing the red, green and blue (R, G, B) color codes in the color control signal bursts. In step S70, the controller is broadcasting data bursts for illuminating the LEDs of the portable light illuminating devices. In step S75, the LEDs continue on to operate in an illuminating state ("on", "off" or "flashing") until the receiving of a new set of verified R, G, B color codes. As described above, the wireless RF data receiving method is performed at the portable light illuminating device 60.

As shown in FIG. 5, a flow chart diagram of a wireless RF data transmission method using a DMX controller 80 and a PC/laptop/phone 90 is shown, which includes the following steps: In step S100, a wireless illuminating color control process is started. In step S105, it is determined as to whether or not to switch a control mode from a program mode to a DMX control mode, and if the answer is "Yes", continue to step S110, and if the answer is "No", then continue to step S115. In step S110, sending out an improvisational manually-adjusted color control signal or a pre-stored color control signal by the DMX controller. In step S115, producing a color control signal using a color show control software and a color light show program on a laptop or PC. The improvisational manually-adjusted color control signal can be implemented by a person manually adjusting or changing the illuminating color for any zone assignment in the nested hierarchical zone codes of one or more zone regions data field for one or more color control signal, which is performed on-the-fly in real-time during the light show so as to provide enhanced dynamic and creative visually appealing effects and enjoyable attendee experience to the venue event. In step S120, the color control signal is transmitted to the lighting controller through an interface. The interface is UART (universal asynchronous receiver/transmitter) with communication standard such as RS232, RS485 . . . etc. In step S125, the color control signals are encoded and sequenced using the lighting controller to be transmitted to the wireless RF transmitter. In step S130, the RF data transmission is initiated from the wireless RF transmitter.

Figure 6:
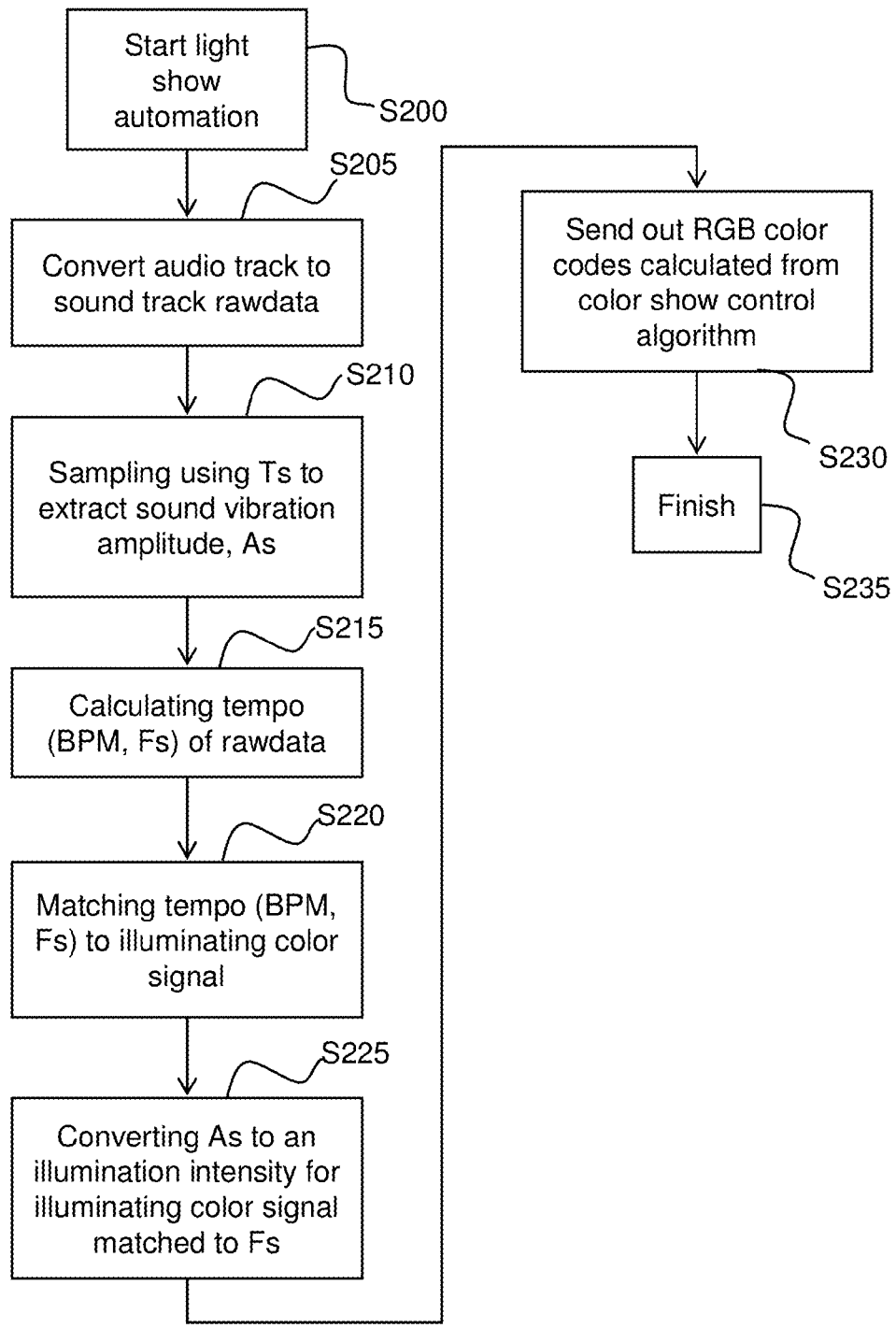
FIG. 6 shows a flow chart of a light show automation method using a sound track in accordance with the embodiment of present invention.
Figure 9:
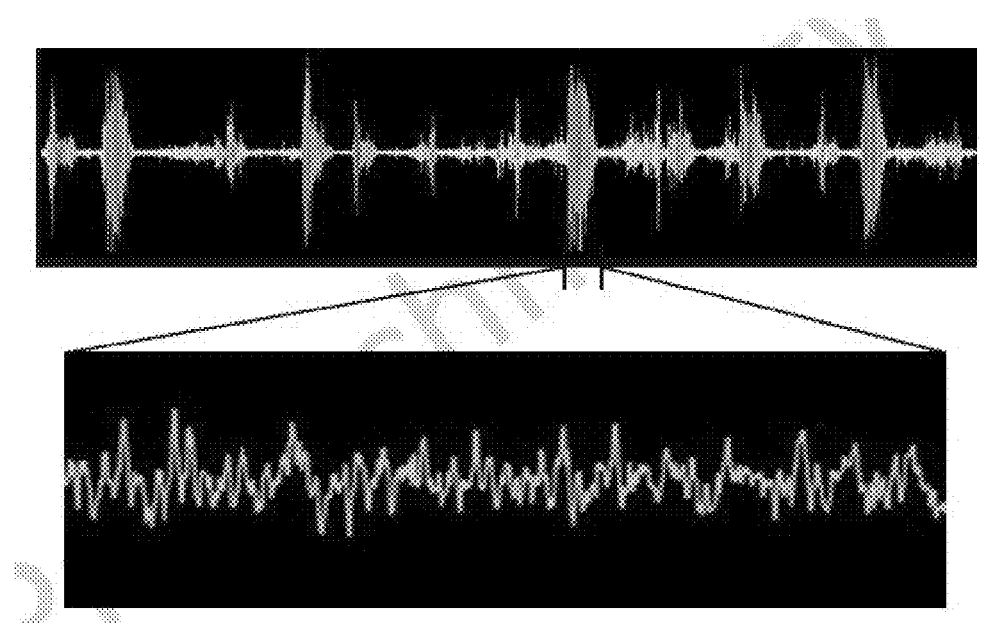
FIG. 9 shows an audio track converted into a sound track raw data according to embodiments of present invention.
Figure 11:
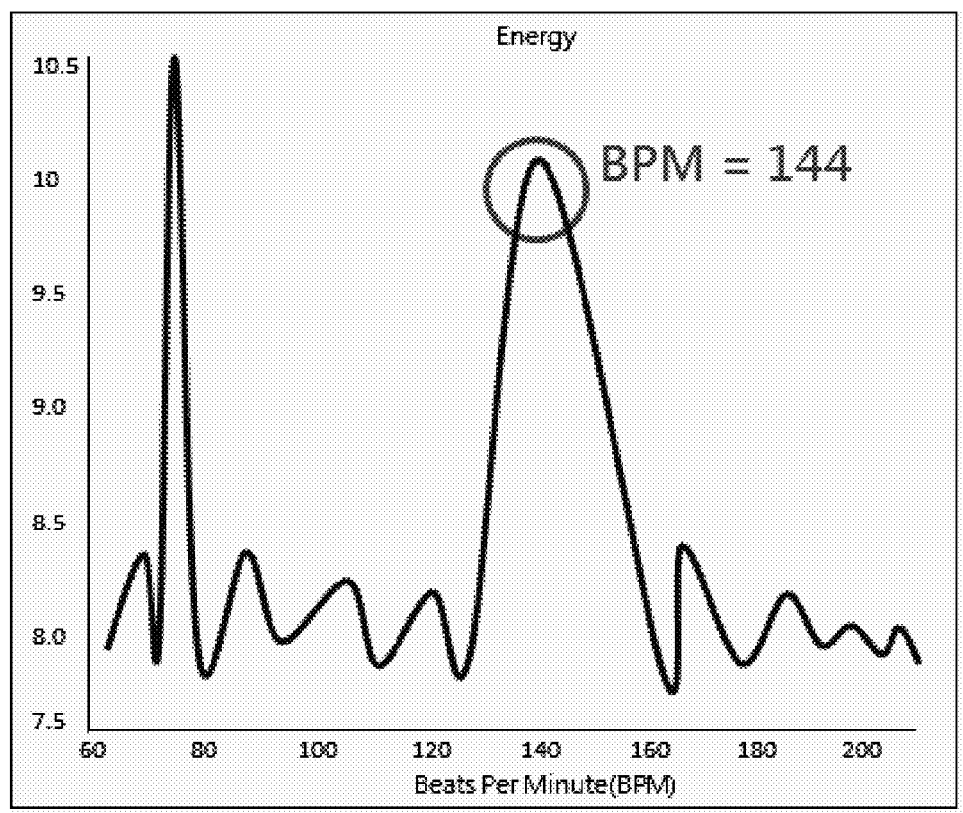
FIG. 11 shows calculation result using a color show control algorithm for calculating tempo in beats per minute (BPM)/(Fs) of the sound track raw data.

As shown in FIG. 6, a light show automation method using a sound track is shown, which includes the following steps: In step S200, a light show automation process is initiated. In step S205, an audio track is converted into a sound track raw data as shown in FIG. 9. In step S210, an audio sampling is performed using Ts to the sound track raw data to extract the sound vibration amplitude, As. In step S215, performing calculations using a color show control algorithm for calculating tempo in beats per minute (BPM)/(Fs) of the sound track raw data as exemplified in FIG. 11. The BPM calculation of color show control algorithm can be taken from a conventional beat detection method, such as, one as described by an online paper titled "Beat This" by Kileen Cheng, et al. from the MIT Media Lab. 2001. (http://www.clear.rice.edu/elec301/Projects01/beat_sync/beatalgo.html)

Figure 10:
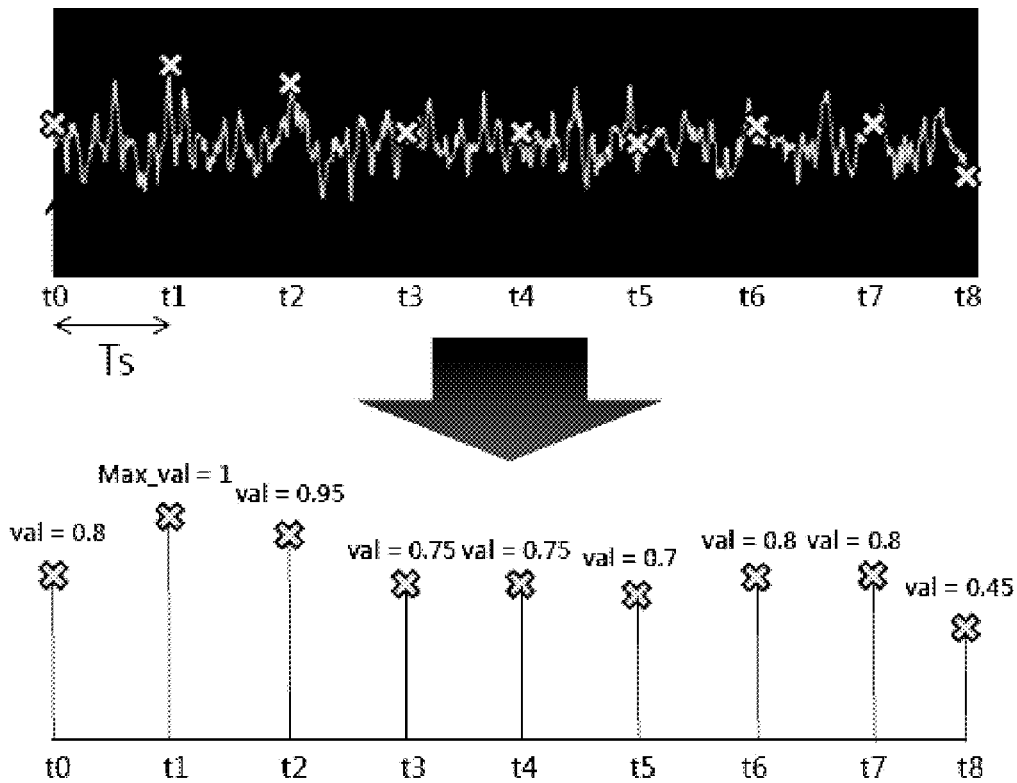

The converted As and Fs from the sound track raw data can be used respectively as part of the dynamic lighting or illuminating effects by having the As to control the illuminating color and the Fs/tempo can be used to control the illuminating intensity. Furthermore, the color show control algorithm can be embedded in the DMX controller 80 or the PC/tablet/phone 90. In step S220, the tempo in BPM Fs is matched to the illuminating color signal. In step S225, the sound vibration amplitude As is converted to an illumination intensity for the illuminating color signal matched with the Fs as shown in FIG. 10. In step S230, the R, G, B color codes calculated from the color show control algorithm are sent or broadcasted out, such as, by the method shown in FIG. 3. In step S235, ending the light show automation process.

Figure 7:
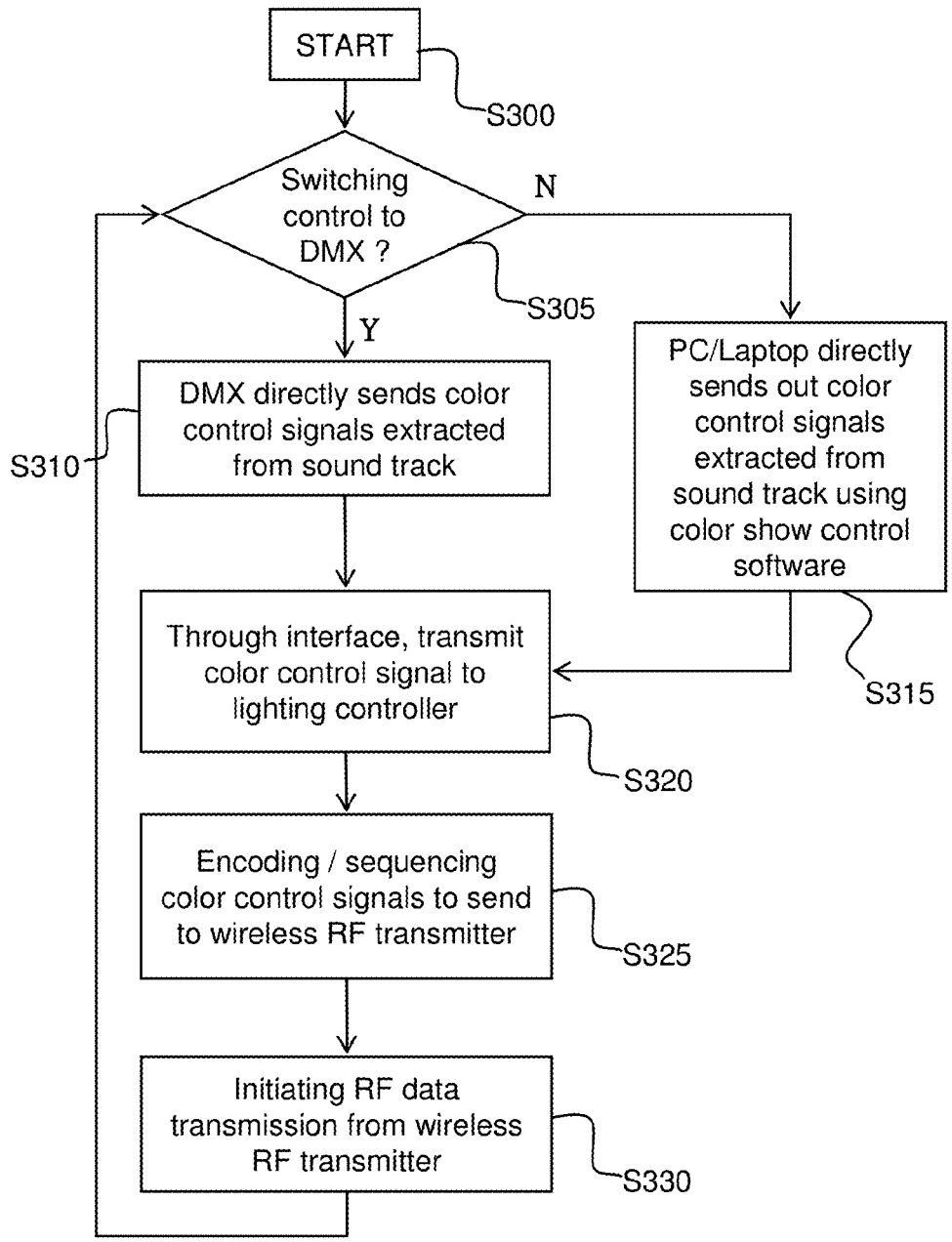
FIG. 7 shows a flow chart of a wireless RF data transmission method using a DMX controller, a PC/laptop/phone, and a sound track in accordance to another embodiment of present invention.

As shown in FIG. 7, a wireless RF data transmission method using a DMX controller 80, a PC/laptop/phone 90, and a sound track is shown, which includes the following steps: In step S300, a wireless illuminating color control process is initiated or started. In step S305, it is determined as to whether to switch a control mode from a program mode to a DMX control mode, and if the answer is "Yes", then continue to Step S310, and if the answer is "No", then continue to Step S315. In step S310, the color control signals extracted from the sound track are directly sent out using a color show control algorithm by the DMX controller. In step S315, the color control signals extracted from the sound track are directly sent out using the color show control software on a laptop or PC. In step S320, the color control signal is transmitted to the lighting controller through an interface. The interface is UART (universal asynchronous receiver/transmitter) with communication standard such as RS232, RS485 . . . etc. In step S325, the color control signals are encoded and sequenced using the lighting controller to be transmitted to the wireless RF transmitter. In step S330, the RF data transmission is initiated.

Figure 8:
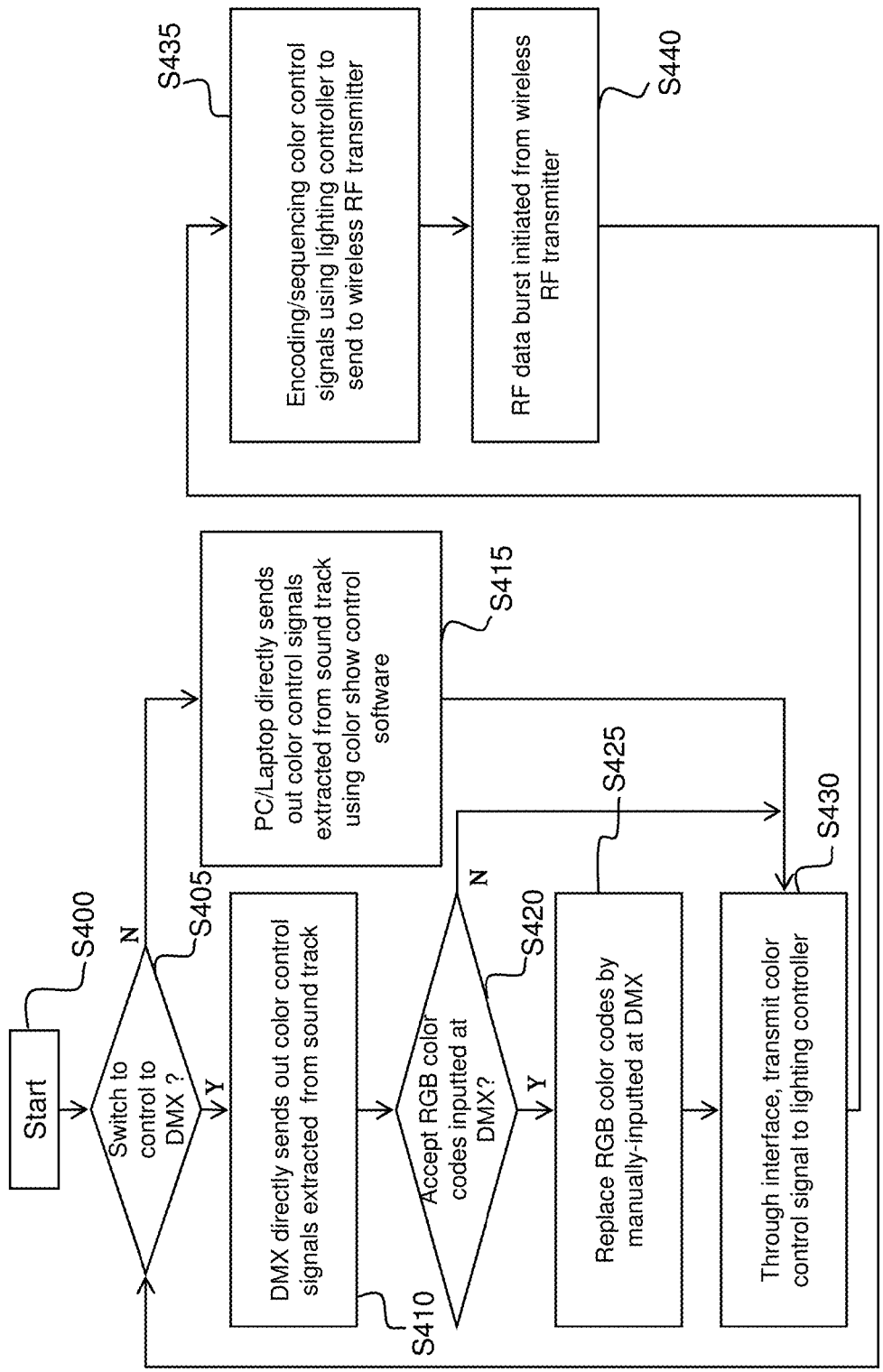
FIG. 8 shows a flow chart of a DMX controller and sound track input control method in accordance with the another embodiment of present invention.

As shown in FIG. 8, a flowchart diagram of a DMX controller 80 and sound track input control method is shown, which include the following steps: In step S400, a wireless illuminating color control process is started. In step S405, it is determined as to whether to switch a control mode from a program mode to a DMX control mode, and if the answer is 'Yes', then continue to Step S410, and if the answer is "No", go to Step S415. In step S410, the color control signals extracted from the sound track are directly sent out using a color show control algorithm by the DMX controller. In step S415, the color control signals extracted from the sound track are directly sent out using the color show control software on a laptop or PC. Then continue on to step S430 upon completing step S415. In step S420, it is determined as to whether to accept a plurality of R, G, B color codes inputted at the DMX controller, and if the answer is "Yes", then continue to Step S425, and if the answer is "No", then continue to Step S430. In step S425, the R, G, B color codes of the color control signal are replaced by the R, G, B color codes manually-inputted at the DMX controller in substantially real time, and then continue to Step S430. The improvisational manually-inputted color control signal can be implemented by a person manually adjusting or changing the illuminating color for any zone assignment in the nested hierarchical zone codes of one or more zone regions data field for one or more color control signal using the DMX controller, which is performed on-the-fly in real-time during the light show so as to provide enhanced dynamic and creative visually appealing effects and enjoyable attendee experience to the venue event. In step S430, the color control signal is transmitted to the lighting controller through an interface. The interface can be UART (universal asynchronous receiver/transmitter) with communication standard such as RS232, RS485 . . . etc. In step S435, encoding and sequencing the color control signals using the lighting controller to be transmitted to the wireless RF transmitter, such as by using the method of FIG. 3. In step S440, the RF data transmission in the form of RF data bursts is initiated from the wireless RF transmitter.

In the above embodiments of present invention, during a typical RF data transmission session during a venue event, sometimes due to the occurrence of localized RF signal interference or signal blocking, some of the RF data bursts may not be correctly detected or received by the corresponding RF receivers of the interactive lighting effect portable light illuminating devices, in the form such as illuminating LED wristbands, illuminating LED necklace or handheld LED glow sticks. Therefore, redundant RF data bursts can be sequentially broadcasted at a time $t_n$ of one color control signal in one RF data burst to the interactive lighting effect portable light illuminating device, and then at a time $t_{n+1}$ of the same redundant color control signal in another RF data burst to the interactive lighting effect portable light illuminating device consecutively, so as to ensure that if the previous time $t_n$ broadcasted RF data burst had been dropped or skipped due to whatever reason it may be, the RF receiver (in question) can be ensured to "catch up" with other adjacent RF receivers located in the same zone region.

In the above embodiments of present invention, the portable light illuminating devices equipped with LEDs configured to be operating in an integrated and coordinated illuminating environment to produce continuous dynamic visual effects on a mass scale using the corresponding interactive lighting effect control system, can be in the form of illuminating LED wristbands and handheld LED glow sticks (or illuminating LED neck lace), offer at least the following advantages or benefits to the public: (a) none of pre-programmed LED illumination light control sequences, indexed by corresponding activation codes, need to be stored inside the memory of the portable light illuminating devices; (b) achieving a light show performance for an entire venue event having plenty of sophisticated or intricate illuminating sequences would only a small amount of zone code multi-level assignment hierarchical table data to be pre-stored in the memory for implementing various surprise or improvisational lighting changes; (c) any lighting change can be integrated on the fly on top of or manually overriding the pre-programmed LED illumination sequences at any time using a DMX lighting controller. In other words, any desired lighting change with various improvisational zone code behaviors need not be already pre-programmed into each of the memory of the illuminating LED wristbands and handheld LED glow sticks ahead of time, for such lighting change to be properly implemented during the venue event. (pairing of light control sequence action and corresponding activation code are not needed at all); (d) subtle color changes during a choreographed lighting control sequence would carry along the same amount of data overhead for the memory of each illuminating LED wristbands and handheld LED glow sticks, because each subtle color change is entered as a RF data burst transmission comprising a set of illuminating color and zone assignment data in the form of a data packet to be broadcasted to all illuminating LED wristbands and handheld LED glow sticks; (e) having improved and more diverse zone assignment capability using more than one nested hierarchical zone codes for the assignment of the zone regions; (f) allows for improved scalability and expansion for usage on a larger scale through adding one or more repeaters for increasing the coverage range of the RF data transmission.

As shown in FIG. 14, a test example for a conventional interactive lighting effect control system showing total amount of data storage required within the memory of each interactive lighting effect portable light illuminating device necessary for achieving the illuminating effects of the table A located on the left-hand side therein would be 500 bytes. On the other hand, FIG. 15 shows a comparative test example for the interactive lighting effect control system of the embodiment of present invention showing total amount of data storage required within the memory of each interactive lighting effect portable light illuminating device necessary for achieving the illuminating effects of table A located on the left-hand side therein requires only 6 bytes of transmitted data. The R_p, the G_p, B_p, and DIM_p represents one byte of transmitted (update) data for red, green, blue, and dimmer color codes between 0 to 255, respectively, which means that color can be dynamically changed on-the-fly. On the other hand, the conventional method shown in FIG. 14 contains a static set of color codes during each broadcast. Therefore, the amount of transmitted data for the present invention is much less than conventional methods and systems.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An interactive lighting effect portable light illuminating device adapted for use with an interactive lighting effect control system with a RF transmitter via wireless data transmissions, the interactive lighting effect portable light illuminating device, comprising:
   a memory having stored therein at least one zone region indexed by one or more nested hierarchical zone codes;
   an RF receiver configured to receive an RF data burst and to capture the RF data burst from the RF transmitter of the interactive lighting effect control system upon verifying authenticity of the RF data burst;
   a controller responsive to the RF data burst, and is coupled to the memory; and
   at least one light source disposed in the interactive lighting effect portable light illuminating device, the at least one light source being operationally responsive to the controller to change an illuminating state thereof,
wherein the RF data burst comprising at least one set of illuminating color and zone assignment data, the controller is configured to cause the at least one light source selectively to be illuminating in accordance with the illuminating color and zone assignment data of the RF data burst and matching the one or more nested hierarchical zone codes stored in the memory of the portable light illuminating device, wherein the one or more nested hierarchical zone codes of the zone regions comprising a first zone code assigned for seating location within one seating zone, a second zone code assigned for a plurality of seating zones, and a third zone code assigned for a segment within one seating zone of the portable light illuminating device, and the one or more nested hierarchical zone codes is a two-dimensional data matrix having a plurality of columns and rows, wherein a data set for the second zone code comprising of a plurality of data fields where each of the data fields occupies more than one row, and a data set for the third zone code comprising of a plurality of data fields where each of the data fields occupies a plurality of subdivided rows, wherein the subdivided rows together form one single row.

2. The interactive lighting effect portable light illuminating device of claim 1, wherein the at least one light source is more than one light source, the controller is configured to cause the light sources selectively to emit light in accordance with a received illuminating color and zone assignment sequence data file for providing continuous automated and coordinated lighting effect, the received illuminating color and zone assignment sequence data file comprising a plurality of prearranged illuminating intensities of red, green and blue light emitting diodes (LEDS) and the nested hierarchical zone codes of the zone regions in sequential data burst timing.

3. The interactive lighting effect portable light illuminating device of claim 1, wherein the at least one light source comprising a plurality of light emitting diodes (LED) having at least colors of red, green and blue.

4. The interactive lighting effect portable light illuminating device of claim 1, wherein illuminating intensity of the red, green and blue LEDS are configured in accordance with red, green and blue color codes (R, G, B) ranging from 0 to 255, respectively.

5. The interactive lighting effect portable light illuminating device of claim 1, wherein the illuminating intensity of the red, green and blue LEDs further comprising a dimmer color code (DIM) ranging from 0 to 255, respectively, and red, green and blue color codes (R1, G1, B1), are respectively determined by:

$$R1 = R \times DIM/255;$$

$$G1 = G \times DIM/255;$$

$$B1 = B \times DIM/255.$$

6. The interactive lighting effect portable light illuminating device of claim 1, wherein the illuminating state of the light source comprising on, off, or flashing.

7. The interactive lighting effect portable light illuminating device of claim 1, wherein the wireless data transmissions are by RF data bursts or Wi-Fi, Bluetooth or ZigBee transmissions.

8. The interactive lighting effect portable light illuminating device of claim 1, wherein two or more interactive lighting effect portable light illuminating devices that are preconfigured with at least one zone region of the one or more nested hierarchical zone codes stored in the memory to be the same are capable of receiving the same set of illuminating color and zone assignment data to cause the light sources selectively to be illuminating in accordance with the same illuminating color and zone assignment data.

9. The interactive lighting effect portable light illuminating device of claim 1, wherein the set of illuminating color and zone assignment data comprising illuminating intensity of the red, green and blue LEDS and the one or more nested hierarchical zone codes of the zone regions.

10. The interactive lighting effect portable light illuminating device of claim 1, wherein interactive lighting effect portable light illuminating device is an illuminating LED wristband, an illuminating LED necklace, or a handheld LED glow stick.

11. The interactive lighting effect portable light illuminating device of claim 1, wherein the illuminating color and zone assignment data contained in one or more color control signals are changed on-the-fly in real-time during a light show by transmitting only one byte of data for red, green, blue, and dimmer color codes between 0 to 255, respectively for the RF data burst.

12. The interactive lighting effect portable light illuminating device of claim 1, wherein the two-dimensional data matrix for the nested hierarchical zones codes includes a column header and a row header, the column header is arranged in accordance by seating zone, the first zone code, the second zone code, and the third zone code, respectively, and the row header is arranged in accordance by a plurality of seating zone section names.

\* \* \* \* \*